Jan. 26, 1965　　　D. C. DAVIS ETAL　　　3,167,718

AUTOMATIC FREQUENCY ACQUISITION CIRCUIT

Filed April 26, 1961

INVENTORS,
DONOVAN C. DAVIS
LOUIS A. ULE.
BY Jack H. Linscott

ATTORNEY.

United States Patent Office 3,167,718
Patented Jan. 26, 1965

3,167,718
AUTOMATIC FREQUENCY ACQUISITION CIRCUIT
Donovan C. Davis, Pasadena, and Louis A. Ule, Rolling Hills, Calif., assignors to the United States of America as represented by the Secretary of the Army
Filed Apr. 26, 1961, Ser. No. 105,824
6 Claims. (Cl. 328—127)

This invention relates to automatic frequency acquisition circuits and more particularly to a closed loop control system employing double integration.

In many automatic radar tracking circuits such as AGCA, for example, two electronic integrators are usually utilized to track an aircraft through heavy electrical noise. In such systems the radar tracking circuitry usually provides an error signal which exists only in a small interval on either side of the input variable. Thus an error signal is provided only a short distance on either side of the aircraft. In applications of this type, there may be little or no error signal to actuate the output over 99% of the range of the input variable. The presence of two integrators in the loop with their inevitable drift, however small, means that in the absence of an error signal they will drift into saturation thereby resulting in a complete loss of control. The means used for acquisition, whatever it may be, must not affect proper control during tracking, yet go into action instantly once the target is lost.

It is an object of the present invention to provide an improved closed loop control system wherein the above limitations are overcome.

It is another object of the present invention to provide an improved closed loop control system wherein instant target acquisition control is maintained.

In accordance with the present invention, there is provided a system for controlling the output of a double integrator adapted for use in a tracking system. The system includes means applied to the input of the first integrator for causing the output thereof to drift in a given direction such that its output approaches saturation and the output of the second integrator approaches zero voltage output. Also included is a feedback loop connected between the output of the second integrator and the input of the first integrator. The feedback loop includes an RC circuit and means responsive to the output of the second integrator when the zero output voltage is reached for developing a voltage across the RC circuit. The output of the RC circuit is applied to the input of the first integrator to cyclically reverse the direction of drift thereof.

For a better understanding of the invention, together with other and further objects thereof, reference is had to the following description taken in connection with the accompanying drawings in which.

Figure 1:
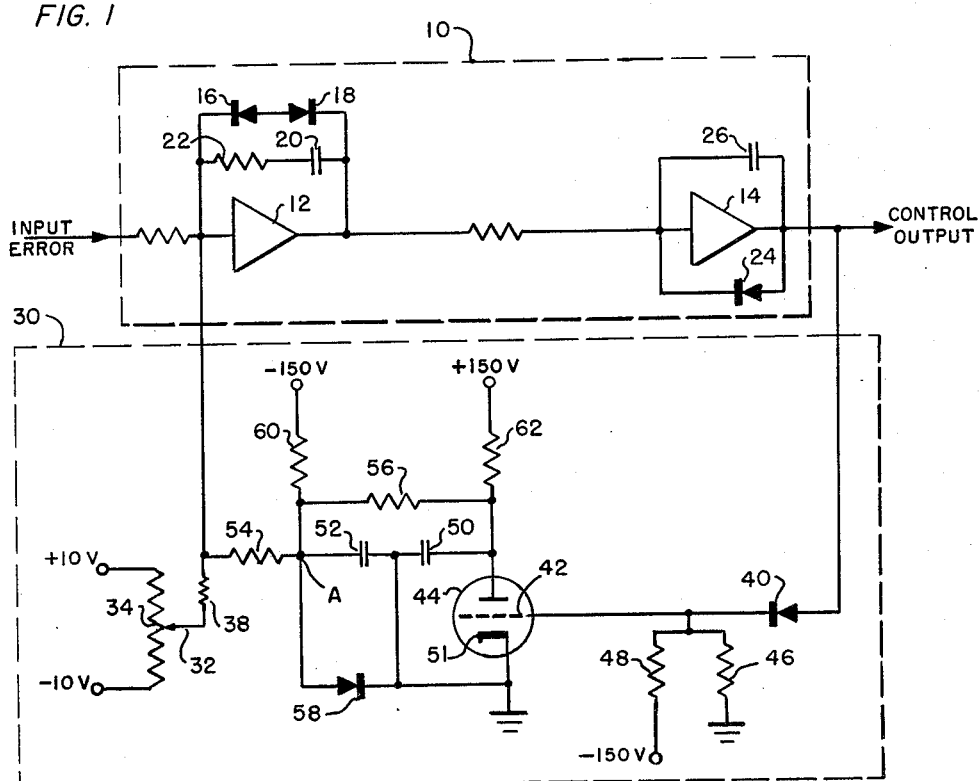
FIG. 1 is a schematic representation of the invention.

Referring now to FIG. 1 of the drawing, the well known double integrator control system is shown in block 10. It comprises a first integrator circuit 12 responsive to the input error signal and a second integrator circuit 14 responsive to the output of first integrator 12 and providing the control output signal. The first integrator 12 includes conventional silicon junction diodes 16 and 18 connected in opposite polarities between the input and output of first integrator 12 to prevent the first integrator from saturating. As shown, the plate elements of the diodes are connected, the cathode of diode 16 being connected to the input of first integrator 12 and the cathode of diode 18 being connected to the output thereof. Also connected between the input and output of first integrator 12 is a conventional feedback circuit including series connected capacitor 20 and resistor 22. A silicon junction diode 24 is connected between the input and output of second integrator 14 with a polarity such that the control output signal is prevented from going positive. The silicon junction diode 24 also limits the negative excursion of the control output signal derived from second integrator 14. What has been described hereinabove does not form any part of the invention but has been included in order to better understand the present invention.

The automatic target acquisition feature which comprises the invention is shown in block 30. A slight positive potential is applied to the input of first integrator 12 through the slider arm 32 of potentiometer 34 across which there is provided a suitable positive and negative D.C. voltage referenced to ground as schematically represented. As shown, the output of slider arm 32 is applied to the input of first integrator 12 through isolation resistor 38. The output of second integrator 14 is applied through a silicon junction diode 40 to the control grid 42 of a triode inverter tube 44. Diode 40 is poled to pass positive going control output signals with the plate electrode thereof connected to the output of second integrator 14 and the cathode electrode thereof connected to grid 42. Grid 42 is biased negatively by means of a voltage divider network including series connected resistors 46 and 48 connected between a negative voltage source, —150 volts for example, and ground. Grid 42 is connected to the junction of resistors 46 and 48. The plate output of inverter tube 44 is applied to the input of first integrator 12 through a delay network comprising resistor 56 and capacitors 50 and 52, and through resistor 54. As shown, capacitors 50 and 52 are connected between the respective terminals of resistor 56 and grounded cathode 51 of tube 44. By such an arrangement, a signal derived from the plate of tube 44 will be delayed before being applied to first integrator 12 through resistor 54. A silicon junction diode 58 poled to pass positive going signals is connected across capacitor 52 with the cathode electrode of diode 58 being connected to ground as shown. Tube 44 D.-C. plate potential is applied through the series connected voltage divider network consisting of resistor 60, resistor 56 and resistor 62. The D.-C. potential applied to the free ends of respective resistors 60 and 62 are equal but opposite in polarity with respect to ground herein shown as —150 volts and +150 volts, respectively. The values of resistors 60, 56, and 62 are chosen such that the potential at the junction of resistors 60 and 56 is maintained substantially at ground when tube 44 is non-conducting and a suitable positive potential is applied to the plate of tube 44. As hereinafter explained the circuit connected between the output of second integrator 14 and the input of first integrator 12 will provide an unstable loop when certain conditions prevail.

Figure 2:
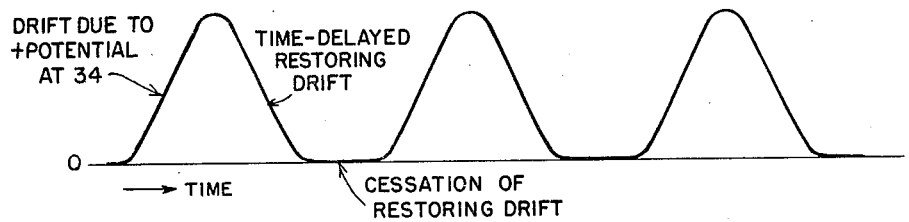
FIG. 2 is an explanatory curve.

The principle of operation in this invention relies upon the integrators to drift when not tracking, that is, when there is an absence of an error signal large enough to effect target acquisition. This drift is made to occur in one direction only by a slight unbalance of first integrator 12 which has some, but negligible effect upon tracking error. The unbalance is made to occur by applying a slights positive potential through slider arm 32 and resistor 38 to the input of first integrator 12. Tube 44 is normally biased to cut-off by means of voltage divider resistors 46 and 48. As the first integrator 12 drifts towards saturation, the output of second integrator 14 approaches zero volts at which time diode 40 is rendered conductive thereby driving tube 44 into conduction to effectively form a closed unstable loop from the output of second integrator 14 to the input of first integrator 12. With tube 14 rendered conductive, the negative output from the plate thereof is applied through the delay circuit comprising resistor 56 and capacitors 50 and 52, and through resistor 54 to the input of first integrator 12. Due to the time constant, there is a delay in building up the magnitude of the negative output voltage which is applied to the input of first integrator 12, and as this voltage becomes gradually more and more negative, eventually the positive unbalancing bias is overcome so that the output of first integrator 12 eventually becomes positive. The delay provided by the capacitors 50 and 52 and resistor 54 is necessary to assure the required instability of the double integrator system. The latter positive voltage is integrated by second integrator 14 causing it to go negative and thus render diode 40 nonconducting. Since some time will elapse before the capacitors 50 and 52 will discharge, the output of second integrator 14 continues to go negative. Eventually the capacitors 50 and 52 do discharge and when complete discharge is achieved, diode 58 will maintain point A at zero or ground potential. When this occurs the input to first integrator 12 is again only the slight positive input from the unbalance control applied thereto through slider arm 32. Eventually this takes its effect and the output of second integrator 14 drifts back. The search voltage derived from second integrator 14 is shown in FIG. 2. The upward trace represents the effect of temporary closure of the unstable loop and the downward trace is the drift back. If anywhere during the cycle, a target is encountered, an error input appears at the first integrator which completely swamps the relatively small voltage producing the automatic search and this error signal then takes complete control.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A system for controlling the output of a double integrator adapted for use in a tracking system comprising means applied to the input of the first integrator for causing the output thereof to drift in a given direction such that the output thereof approaches saturation and the output of the second integrator approaches zero voltage output, and means including a feedback loop coupled between the output of said second integrator and the input of said first integrator and responsive to only said zero voltage output for cyclically reversing the drift of said first integrator.

2. A system for controlling the output of a double integrator adapted for use in a tracking system comprising means applied to the input of the first integrator for causing the output thereof to drift in a given direction such that the output thereof approaches saturation and the output of the second integrator approaches zero voltage output, a feedback loop connected between the output of said second integrator and the input of said first integrator, said feedback loop including delay means responsive to the output of said second integrator only when said zero output voltage is reached whereby there is produced a voltage to cyclically reverse the direction of drift of said first integrator.

3. A system for controlling the output of a double integrator adapted for use in a tracking system comprising means applied to the input of the first integrator for causing the output thereof to drift in a given direction such that the output thereof approaches saturation and the output of the second integrator approaches zero voltage output, a feedback loop coupled between th output of said second integrator and the input of said first integrator, said feedback loop comprising means for producing a feedback signal only when said zero voltage output is reached, said feedback signal being of a polarity to reverse the direction of drift in said first integrator.

4. A system for controlling the output of a double integrator adapted for use in a tracking system comprising means applied to the input of the first integrator for causing the output thereof to drift in a given direction such that the output thereof approaches saturation and the output of the second integrator approaches zero voltage output, a feedback loop coupled between the output of said second integrator and the input to said first integrator, said feedback loop comprising a vacuum tube, means for rendering said vacuum tube normally non-conductive, means responsive to the output of said second integrator only when said zero output voltage is reached whereby said vacuum tube is rendered conductive, and delay means coupling the output of said vacuum tube to the input of said first integrator and responsive to the output of said second integrator for cyclically reversing the direction of drift of said first integrator.

5. The system in accordance with claim 4 wherein said delay means comprises an RC circuit.

6. A system for controlling the output of a double integrator adapted for use in a tracking system comprising means applied to the input of the first integrator for causing the output thereof to drift in a given direction such that the output thereof approaches saturation and the output of the second integrator approaches zero voltage output, a feedback loop coupled between the output of said second integrator and the input to said first integrator, said feedback loop comprising a vacuum tube having at least a control grid, a plate and a cathode, means for biasing said grid such that said tube is normally non-conductive, a diode interconnecting the output of said second integrator and said grid and responsive to the output of said second integrator when said zero voltage output is reached whereby said tube is rendered conductive, and an RC circuit interconnecting the plate of said tube and the input to said first integrator, the voltage developed across said RC circuit being applied to the input circuit of said first integrator to cyclically reverse the drift thereof.

References Cited by the Examiner

UNITED STATES PATENTS 2,584,882  2/52  Johnson _____ 328—142 X

FOREIGN PATENTS 820,312  9/59  Great Britain.

OTHER REFERENCES

Sykes: "Calibrating Analog-Computer Integrators," Instruments and Control Systems, September 1960, pages 1555 to 1559 (page 1559 relied on).

ARTHUR GAUSS, *Primary Examiner.*

HERMAN KARL SAALBACH, *Examiner.*